United States Patent
Clowes et al.

(10) Patent No.: US 9,722,389 B2
(45) Date of Patent: *Aug. 1, 2017

(54) FIBER LASER HAVING OPTICAL RESONATOR COMPRISING TAPERED ELEMENT

(71) Applicant: Fianium Ltd., Southampton (GB)

(72) Inventors: John Redvers Clowes, New Milton (GB); Jonathan William Gill, Four Marks (GB); Stephen Green, Southampton (GB); Mridu Kalita, Southampton (GB); Adam Lee Devine, Southampton (GB); Anatoly Borisovich Grudinin, Southampton (GB)

(73) Assignee: NKT Photonics A/S, Birkerod (DK)

( * ) Notice: Subject to any disclaimer, the term of this patent is extended or adjusted under 35 U.S.C. 154(b) by 0 days.

This patent is subject to a terminal disclaimer.

(21) Appl. No.: 14/619,471

(22) Filed: Feb. 11, 2015

(65) Prior Publication Data

US 2015/0303644 A1 Oct. 22, 2015

Related U.S. Application Data

(63) Continuation of application No. 13/899,634, filed on May 8, 2013.

(Continued)

(51) Int. Cl.
*H01S 3/30* (2006.01)
*H01S 3/067* (2006.01)
(Continued)

(52) U.S. Cl.
CPC .......... *H01S 3/06745* (2013.01); *H01S 3/067* (2013.01); *H01S 3/0675* (2013.01);
(Continued)

(58) Field of Classification Search
CPC ............ H01S 3/06708; H01S 3/08059; H01S 3/06745; H01S 3/11; H01S 3/08013;
(Continued)

(56) References Cited

U.S. PATENT DOCUMENTS 5,818,630 A 10/1998 Fermann et al.
5,864,644 A * 1/1999 DiGiovanni ......... G02B 6/2856
385/43

(Continued)

FOREIGN PATENT DOCUMENTS

EP 2662939 A2 11/2013
JP 9227149 A 9/1997
(Continued)

OTHER PUBLICATIONS

Seo, Hong-Seok et al., "Single Mode Laser Osciallation in an Nd-Doped Large Core Double Clad Fiber Cavity with concatenated Adiabatic Tapers" ETRI Journal, vol. 24, No. 3, Jun. 2002.

(Continued)

*Primary Examiner* — Kinam Park
(74) *Attorney, Agent, or Firm* — Peter Rainville

(57) ABSTRACT

A laser system for generating optical pulses at an operating wavelength of the laser system. The system has an optical resonator comprising first and second reflectors, and a tapered optical fiber disposed between the first and second reflectors. The tapered optical fiber has a core which has a tapered input section which tapers from single mode to multimode at the laser operating wavelength, an inner section of substantially constant diameter capable of supporting multiple modes at the laser operating wavelength and a tapered output section which tapers from a first diameter to a second diameter that is smaller than the first diameter.

15 Claims, 17 Drawing Sheets

Related U.S. Application Data

(60) Provisional application No. 61/793,534, filed on Mar. 15, 2013, provisional application No. 61/644,424, filed on May 8, 2012.

(51) Int. Cl.
  *H01S 3/08* (2006.01)
  *H01S 3/11* (2006.01)

(52) U.S. Cl.
  CPC ...... *H01S 3/06708* (2013.01); *H01S 3/06716* (2013.01); *H01S 3/06754* (2013.01); *H01S 3/08013* (2013.01); *H01S 3/08059* (2013.01); *H01S 3/11* (2013.01); *H01S 3/1118* (2013.01); *H01S 2301/02* (2013.01); *H01S 2301/03* (2013.01)

(58) Field of Classification Search
  CPC .... H01S 3/06754; H01S 3/1118; H01S 3/067; H01S 3/06716; H01S 3/0675
  USPC ........................................................ 372/6, 18
  See application file for complete search history.

(56) References Cited

U.S. PATENT DOCUMENTS

| | | | |
|---|---|---|---|
| 6,275,512 B1 | 8/2001 | Fermann | |
| 6,324,326 B1 | 11/2001 | Dejneka et al. | |
| 6,477,295 B1 | 11/2002 | Lang et al. | |
| 6,751,241 B2 | 6/2004 | Davis et al. | |
| 6,836,607 B2 | 12/2004 | Dejneka et al. | |
| 6,944,192 B2* | 9/2005 | Prassas | H01S 3/063 372/6 |
| 6,948,862 B2 | 9/2005 | Brown et al. | |
| 6,975,792 B1 | 12/2005 | Goldberg et al. | |
| 6,999,481 B1 | 2/2006 | Jurgensen | |
| 7,782,912 B2* | 8/2010 | Harter | H01S 3/0092 372/25 |
| 8,027,557 B2 | 9/2011 | Frith | |
| 8,068,705 B2 | 11/2011 | Gapontsev et al. | |
| 9,071,033 B2* | 6/2015 | Clowes | H01S 3/06708 |
| 2002/0018287 A1 | 2/2002 | Zellmer et al. | |
| 2003/0210725 A1* | 11/2003 | Prassas | H01S 3/063 372/50.1 |
| 2008/0050069 A1* | 2/2008 | Skovgaard | G02B 6/02376 385/39 |
| 2009/0080835 A1* | 3/2009 | Frith | G02B 6/14 385/50 |
| 2009/0097515 A1 | 4/2009 | Harter et al. | |
| 2011/0058250 A1 | 3/2011 | Liu et al. | |
| 2012/0127563 A1 | 5/2012 | Farmer et al. | |
| 2012/0219026 A1 | 8/2012 | Saracco et al. | |
| 2012/0262781 A1 | 10/2012 | Price et al. | |
| 2015/0303644 A1* | 10/2015 | Clowes | H01S 3/06708 372/6 |

FOREIGN PATENT DOCUMENTS

| | | |
|---|---|---|
| JP | 2002270928 A | 9/2002 |
| JP | 2007250951 A | 9/2007 |
| WO | 9210014 A1 | 6/1992 |
| WO | 2006076524 A2 | 7/2006 |
| WO | 2009043964 A1 | 4/2009 |
| WO | 2013102033 A1 | 7/2013 |

OTHER PUBLICATIONS

V. Filippov et al., "Double Clad Tapered Fiber for High Power Applications" Optics Express, vol. 16., No. 3, pp. 1929-1944, Feb. 4, 2008.

Jeong, et al., "Continuous wave single transverse mode laser oscillation in a Nd-doped large core double clad fiber cavity with concatenated adiabatic tapers" Optics Communications 213 (2002) 33-37.

Okhotnikov, O.G. et al., "Flared single-transverse-mode fibre amplifier" Electronics Letters, vol. 35 No. 12, Jun. 10, 1999.

\* cited by examiner

FIBER LASER HAVING OPTICAL RESONATOR COMPRISING TAPERED ELEMENT

CROSS REFERENCE TO RELATED APPLICATIONS

The present application claims priority under 35 U.S.C. §120 to U.S. patent application Ser. No. 13/889,634, entitled "Laser and Amplifiers Having Tapered Elements" filed 8 May 2013, which further claims priority under 35 U.S.C. §119(e) to U.S. Provisional Patent Application Ser. No. 61/644,424, entitled "Amplifying Optical Device Having Tapered Gain Element", filed 8 May 2012 and to U.S. Provisional Patent Application Ser. No. 61/793,534, entitled "Lasers and Amplifiers Having Tapered Elements", filed 15 Mar. 2013. The foregoing applications are incorporated by reference herein.

FIELD OF THE INVENTION

The present invention relates to optical gain devices such as lasers and amplifiers, and more particularly, to optical fiber based amplifying optical devices, such as pulsed fiber amplifiers and pulsed fiber lasers, and to methods of making and using the same.

BACKGROUND

Fiber based lasers and amplifiers can act as "brightness converters" that convert high power, low brightness pump light to coherent, higher brightness output light. Obtaining higher output powers—key for fiber based devices to become even more competitive with conventional gas and solid stated lasers—typically means delivering higher pump powers to the doped core (typically rare earth doped) of the active fiber of the fiber laser or amplifier. Higher power pump diodes or diode modules typically have a multimode (MM) output that lacks sufficient beam quality to readily directly couple to the small area core of a typical optical fiber. Single mode (SM) pump diodes have better beam quality and can directly couple, but typically have too low a power output.

A double clad (DC) fiber includes a larger inner cladding ("pump cladding") surrounding the smaller, active core and a second cladding about the inner cladding. MM pump diodes can couple to the larger area of the inner cladding/core and the pump light is absorbed by the active material in the core as the light propagates within the inner cladding. Pump light absorption (typically measured in dB/meter) is significantly reduced compared to core pumping, and so the length of the gain fiber is increased to provide for a total required absorption. For many devices, such as certain continuous wave (CW) devices, which may not involve as high power intensities as pulse devices, the increased length can be a small price to pay for the increased output power, and the DC fiber represented a key advance.

Increased power output (e.g., one or more of average power, peak pulse power, or pulse energy) of pulsed lasers and amplifiers is also of keen interest. However, such devices are more complex, and obtaining increased power output more problematic, especially as the pulse duration decreases, as the peak power can become quite high and the attendant high power intensity can trigger nonlinearities can limit the output power from an amplifying optical device, such as a fiber laser or fiber amplifier. Nonlinear effects can also limit the length of fiber within lasing cavities, making low repetition rate mode locked lasers (e.g., lower than 20 MHz) difficult to design. Pulsed devices, as well as CW amplifying optical devices, could benefit from improvements.

SUMMARY OF THE INVENTION

Applicants have considered the problem of addressing nonlinearities so as to realize attendant benefits, such as providing higher powers and/or lower repetition rates in optical gain devices, with particular regard to pulsed optical fiber amplifiers, such as, for example, those based on rare earth active material (e.g., ytterbium (Yb)) and providing sub nanosecond (1 ns or less) pulses.

Pulsed fiber lasers and amplifiers involve high peak powers that can trigger nonlinearities that limit useful output power. Such nonlinearities can include self-phase-modulation (SPM), stimulated Raman Scattering (SRS) or stimulated Brillouin scattering (SBS). The strengths of all of these nonlinear effects scale either linearly (for SPM) or exponentially (for SRS and SBS) in proportion to fiber length and pulse power, and in inverse proportion to the mode area of the propagating mode. There is often an interaction length associated with these deleterious nonlinear phenomena, meaning that either the threshold for onset is a function of the length of the gain fiber (and is higher for shorter lengths) and/or the amount of energy lost to nonlinear effects remains below an unacceptable amount for the shorter lengths of gain fiber.

In considering the foregoing Applicants have discovered improvements that can provide for higher output power laser and amplifier optical devices, including, for example, methods and apparatus that can allow for shorter lengths of gain fiber, as is discussed in more detail below. The shorter lengths can have higher thresholds for the onset of a deleterious nonlinearity, and hence allow higher output power. As will also be evident below, other teachings are provided as well, including, for example, methods and apparatus directed to improved seed sources and narrow bandwidth sources, including, for example, the use of longer lengths of fiber within lasing cavities, which allows lower repetition rates. Generally, the teachings herein are considered of use in amplifying optical devices in addition to pulsed fiber devices, and, as regards fiber devices, in both core pumped and cladding pumped applications.

In one aspect of the invention, there is provided a laser system for generating optical pulses at an operating wavelength of the laser system. The system can include an optical resonator comprising first and second reflectors and a tapered optical fiber (TOF) disposed between the first and second reflectors. The tapered fiber can include a core having a tapered input section which tapers from single mode to multimode at the laser operating wavelength, a central or inner section of substantially constant diameter capable of supporting multiple modes at the laser operating wavelength and a tapered output section which tapers from a first diameter to a second diameter that is smaller than the first diameter.

Thus, in various embodiments, the tapered fiber has a core having a section of substantially constant diameter, which is arranged between the tapered input section and the tapered output section. This section of substantially constant diameter may be referred to herein as an "inner section", or a "central section", or an "intermediate section".

Various other features and aspects of the invention are now described. The features, aspects and practices described herein may be arranged in any combination with any of the other features, aspects or practices described herein, regardless of the particular exemplary embodiment in which such a feature, aspect or practice is described, except where clearly mutually exclusive or a statement is explicitly made herein that such a combination is unworkable. To avoid undue repetition and length of the disclosure, every possible combination is not explicitly recited as a separate embodiment. The various embodiments of the invention considered disclosed as within the scope of the invention are at least as described in the multiply dependent claims appended hereto. As the skilled worker can ascertain, the methods of the present disclosure may include any of the features, or steps relating to the function or operation thereof, disclosed in conjunction with the description herein of apparatus and systems.

The tapered output section of the core can taper from a diameter capable of supporting multiple modes to single mode at the laser operating wavelength. The central section can comprise a large mode area fiber.

The taper of the tapered input and output sections can be such that the single mode guidance of the tapered sections is maintained during the transition to the central section so that substantially only the fundamental mode propagates through the central section. The first diameter of the tapered output section in the system can be substantially matched to the diameter of the central section. The gain medium of the laser system can be comprised of the tapered optical fiber. The gain medium can comprise a length of rare earth doped (RED) optical fiber separate from the TOF.

The laser system can further comprise a seed light source for inputting light into the optical resonator.

The TOF can comprise at least 80% of the length of the optical resonator. The TOF can comprise at least 90% of the length of the optical resonator. The length of the TOF in the laser system can be chosen to ensure that the repetition rate of the generated optical pulses is no more than about 15 MHz, no more than about 10 MHz, no more than about 5 MHz, or no more than 1 MHz. The optical resonator can include more than 40 meters (m) of optical fiber, more than 50 m of optical fiber, more that 75 m of optical fiber, or more than 90 m of optical fiber. The optical resonator can provide pulse have a pulse duration of 100 ps or less. The length of optical fiber comprised by the resonator can be approximately 100 m, the TOF can be approximately 98 m long and the repetition rate of the generated optical pulses can be approximately 1 MHz.

The first reflector can comprise a chirped fiber Bragg grating. The second reflector can comprise a semiconductor saturable absorber mirror. One or more free space optical elements can be disposed between the tapered output section and a reflector, such as, for example, the second reflector. The TOF can be composed of a single continuous piece of fiber.

The second reflector can comprise a semiconductor saturable absorber mirror and one or more free space optical elements can be disposed between the tapered output section and the semiconductor saturable absorber mirror. The TOF can be composed of a single continuous piece of fiber.

The laser system can be arranged such that amplified spontaneous emission (ASE) power is no greater than 10% of the total optical power output from said optical resonator. The system can be arranged such that any optical power generated at the first Raman stoke shift is no greater than 10% of the total optical power output from said optical resonator. The generated optical pulses can have a spectrum with a fundamental wavelength and the system can be arranged such that no more than 10% of the total optical power output from said optical resonator is outside of a 30 nm bandwidth centered about the fundamental wavelength.

The laser system can be configured such that an optical signal intensity within the central section of the TOF remains high enough such that the amplified spontaneous emission (ASE) power is no greater than 10% of the total optical power output from said optical resonator and also wherein said optical signal intensity remains low enough such the optical power generated at the first Raman stoke shift is no greater than 10% of the total optical power output from said optical resonator. The system can be arranged such that ASE optical power and Raman stoke shifted optical power corresponding to the first Stokes shift taken together do not account for more than 20% of the total optical power output from said optical resonator.

The tapered input section and/or the tapered output section may include a nonlinear taper profile. The tapered input section and/or the tapered output section may include a substantially linear taper profile. The tapered input section and/or the tapered output section may include a substantially exponential taper profile. In one practice of the invention, the length of the tapered input section and the tapered output section combined can comprise no more than 10% of the total length of the TOF.

The central section of the core of the TOF can have a refractive index (RI) profile which is substantially constant. The central section of the core of the TOF has a refractive index (RI) profile taken relative to silica wherein the percentage RI variation of the core RI according to the formula [(maximum RI−minimum RI)/(2×minimum RI)]×100 is no greater than about 20%. In one practice, the variation according to the foregoing formula is no greater than about 15%. In another practice, variation according to the formula is no greater than about 11%.

In another aspect of the invention there is provided an optical fiber amplifier apparatus for providing short, high power optical pulses comprising a TOF for amplifying optical input pulses having an input signal wavelength responsive to receiving pump light having a second wavelength that is different than the input signal wavelength. The TOF may comprise a RED core comprising a concentration of rare earth material and may have an input end at which the core has a first diameter, an output end at which the core has a second diameter that is larger than the first diameter and a tapered length along which the core diameter increases from the first to the second diameter, where the tapered length is no greater than 250 cm and the core is single mode at the input signal wavelength at the input end and multimode at the input signal wavelength at the second end. The optical fiber amplification apparatus may be further configured such that the TOF includes an absorption rate of pump light of at least 2.5 dB/meter and provides optical output pulses from the output end having a time duration of less than 500 ns and a peak power of at least 100 kW.

The TOF may be adapted to provide the output pulses having an $M^2$ of no greater than about 1.2. The optical fiber amplifier apparatus may be arranged such that amplified spontaneous emission (ASE) power is no greater than 10% of the total optical power output from the output end. The optical fiber amplifier apparatus may be arranged such that any optical power generated at the first Raman stoke shift is no greater than 10% of the total optical power output from the output end. The output optical pulses may have a spectrum with a fundamental wavelength and wherein the optical fiber apparatus is arranged such that no more than 10% of the total optical power output from the output is outside of a 30 nm bandwidth centered about the fundamental wavelength.

The tapered length may have taper profile arranged such that the output signal is substantially single mode and wherein the signal intensity therealong remains high enough such that the ASE power is no greater than 10% of the total optical power output from the output end and also wherein the optical signal intensity remains low enough such the optical power generated at the first Raman stoke shift is no greater than 10% of the total optical power output from the output end. The optical fiber amplification apparatus may be arranged such that amplified spontaneous emission (ASE) optical power and Raman stoke shifted optical power corresponding to the first Stokes shift, taken together, do not account for more than 20% of the total optical power output from the output end.

The optical amplifier apparatus may be arranged such that the TOF is substantially core pumped. The TOF may comprise a pump cladding and the optical fiber amplifier apparatus may be arranged such that the TOF is substantially cladding pumped. The optical fiber amplifier apparatus may include an optical pump source. The optical pump source may be arranged for substantially core pumping the TOF and may have a substantially single mode output.

The optical fiber amplifier apparatus may be configured such that the TOF includes an absorption rate of pump light of at least 5 dB/meter. The optical fiber amplifier apparatus may be configured such that the TOF includes an absorption rate of pump light of at least 9 dB/meter. In one practice of the invention, the tapered length is no greater than 100 cm. In another practice, the tapered length is no greater than 75 cm. In a further practice of the invention, the tapered length is no greater than 50 cm. The tapered length may include a nonlinear taper profile, such as, for example, an exponential taper profile. The tapered length may include a substantially linear taper profile. The tapered length may extend along a longitudinal direction and the magnitude of the rate of change of the diameter of the core with respect to longitudinal length at a first location along the taper may be greater than the magnitude of the rate of change of the diameter of the core with respect to longitudinal length at second location along the tapered length. The diameter of the core may be larger at the first location than at the second location. The diameter of the core may be smaller at the first location than at the second location. The diameter of the core at the output end may be least 1.5 times the diameter of the core at the input end. The diameter of the core may increase substantially monotonically along the taper length. The TOF may be drawn on a draw tower and the tapered length formed in a post-draw tapering process. The tapered length may include a recoat section of cladding. The tapered length may include at least a section that does not include a pump cladding.

The optical fiber amplifier apparatus may comprise a mode locked laser seed source in optical communication with the optical fiber amplifier for providing the optical input pulses.

The optical fiber amplifier apparatus may be configured such that the output pulses have a repetition rate of at least 1 MHz. The optical fiber apparatus may be configured such that the output pulses have a repetition rate of at least 10 MHz. The optical fiber amplifier apparatus may be configured such that the output pulses can have a repetition rate of at least 25 MHz. The optical fiber apparatus may be configured such that the output pulses can have an average power of greater than 1 W. The optical fiber apparatus may be configured such that the output pulses can have an average power of greater than 50 W.

The optical fiber amplifier apparatus may be configured such that the output pulses have a repetition rate of no more than 25 MHz. The optical fiber apparatus may be configured such that the output pulses have a repetition rate of no more than 10 MHz. The optical fiber amplifier apparatus may be configured such that the output pulses can have a repetition rate of no more than 1 MHz. The optical fiber apparatus may be configured such that the output pulses can have an average power of greater than 1 W. The optical fiber apparatus may be configured such that the output pulses can have an average power of greater than 50 W.

The optical fiber amplifier apparatus may be configured such that the output pulses have a picosecond time duration. The optical fiber amplifier apparatus may be configured such that the output pulses comprise picoseconds pulse having a time duration of less than 100 ps. The optical fiber amplifier apparatus may be configured such that output pulses have a time duration of less than 250 ps. The optical fiber amplifier apparatus can be configured such that the output pulses have a peak power of at least 500 kW. The optical fiber amplifier apparatus may be configured can be configured such that the output pulses have a peak power of at least 1 MW. The optical fiber amplifier apparatus can be configured such that the output pulses have a pulse energy of at least 2.5 µJ. The optical fiber amplifier apparatus can be configured such that the output pulses have a pulse energy of at least 5 µJ. The optical fiber amplifier apparatus can be configured such that the output pulses have a pulse energy of at least 10 µJ.

In another aspect of the invention, there is provided a laser system for generating optical pulses at an operating wavelength of the laser system, the system having an optical resonator comprising: first and second reflectors; and a TOF disposed between the first and second reflectors and having a core which has a tapered first section which tapers from single mode to multimode at the laser operating wavelength and a second section of substantially constant diameter capable of supporting multiple modes at the laser operating wavelength and having an output end, wherein the length of the TOF is configured such that the repetition rate of the laser system is no more than 10 MHz.

The length of the TOF can configured such that the repetition rate of the laser system is no more than 5 MHz. The length of the TOF can be configured such that the repetition rate of the laser system is no more than 1 MHz. The second reflector can comprise a semiconductor saturable absorber mirror and the output end of the second section of the core of the TOF can be butt-coupled to the semiconductor saturable absorber mirror. The second reflector can comprise a semiconductor saturable absorber mirror and the output end of the second section of the core of the TOF can be in optical communication with the semiconductor saturable absorber mirror via one or more free space optical elements.

The output end of the second section of the core of the TOF can be spliced to, or continuously connected to, a tapered third section which tapers from a first diameter to a second diameter that is smaller than the first diameter. The tapered third section of the core can taper from a diameter capable of supporting multiple modes to single mode at the laser operating wavelength.

In yet an additional aspect, the invention provides an optical fiber that can comprise a core and at least one cladding layer disposed around the core. The optical fiber, at a first end, can have a first tapered section in which the core tapers from a single mode diameter to a multimode diameter.

The optical fiber can have a second tapered section which tapers from a first diameter to a second diameter that is smaller than the first diameter at a second end. Between the first and second tapered sections, the central core section can have substantially constant diameter and be capable of supporting multiple modes. The refractive index profile of the core of the optical fiber can be substantially uniform.

The optical fiber can be configured to operate as a single mode fiber for light having a wavelength of approximately 1064 nm. In certain practices, the central core section of the optical fiber can have a refractive index (RI) profile taken relative to silica wherein the percentage RI variation of the core RI according to the formula [(maximum RI−minimum RI)/(2×minimum RI)]×100 is no greater than about 20%. The variation according to the foregoing formula in certain practices is no greater than about 15%; in certain practices the variation is no is no greater than about 11%.

In certain practices the central core section of the optical fiber has a refractive index (RI) profile taken relative to silica wherein the percentage RI variation of the core relative to a RI of a shoulder of the core RI profile is according to the formula [(maximum variation RI−shoulder RI)/shoulder RI]×100 no greater than about 30%. In certain practices the percentage RI variation is no greater than about 25%. In certain practices the percentage variation is no greater than about 11%.

"Amplifying optical device", as that term is used herein, means a laser or amplifier optical device. Picosecond optical pulses", as that term is used herein, means pulses having a time duration of no less than 500 fs (femtosecond) and no greater than 1 ns (nanosecond); "nanosecond optical pulses", as that term is used herein, means pulses having a time duration of no less than 500 ps (picoseconds) and no greater than its (microsecond). "Short optical pulses", as that term as used herein, means pulses having a time duration of no greater than 500 nanoseconds; "ultrashort optical pulses", as that term is used herein, means optical pulses having a time duration of no greater than 500 ps.

Light, as that term is used herein, is not understood to be limited to visible light but is used in the broader sense of optical electromagnetic energy.

Time durations, such as pulsewidths, and bandwidths as specified herein are full width, half maximum (FWHM) time durations and bandwidths, unless otherwise noted.

A gain material, as that term is used herein, means a material that can provide optical gain at a wavelength (referred to herein as a "gain wavelength") responsive to being optically pumped at another wavelength (referred to herein as a "pump or pumping wavelength"). The gain wavelength may comprise the output wavelength of a laser cavity or an amplified input signal output by an optical amplifier. However, the concept of optical pumping and gain is not limited to a laser or amplifier, and the term "amplifying optical device" (or "laser and amplifier optical device") is used herein to include the broader class of devices that involve optical gain responsive to optical pumping. Typically, the optical gain is produced via a process of stimulated emission responsive to a population inversion created by the optical pumping. In each of the embodiments discloses herein, the optical gain may be produced via a process of stimulated emission responsive to optical pumping. The optical pumping may create a population inversion.

A gain material may comprise a RED material. RED material, as that term is used herein, means a material comprising one or more of the rare earths (typically as ions) such as, for example, one or more of the Lanthanide elements of the periodic table (e.g., elements having atomic numbers from 57 to 71). Erbium (Er), neodymium (Nd), holmium (Ho), thulium (Tm), and ytterbium (Yb) are all understood to be rare earths that are particularly useful in amplifying optical devices, such as, for example, optical lasers, amplifiers, ASE sources or superfluorescent sources. A RED material can comprise more than one rare earth (e.g., Er/Yb RED materials can be very useful). A gain material, however, need not comprise a RED material. For example, a gain material may comprise Ti-Sapphire, which is used in many solid state lasers.

The amplifying optical device may comprise an optical fiber, where the optical fiber comprises the gain material. The gain optical fiber may comprise a microstructured optical fiber. A pump source may comprise a selected RED material that comprises a rare earth comprised by the RED material. The RED material may comprise one or more of holmium, neodymium, erbium, ytterbium or thulium.

BRIEF DESCRIPTION OF THE DRAWINGS

Not every component is labeled in every one of the foregoing FIGURES, nor is every component of each embodiment of the invention shown where illustration is not considered necessary to allow those of ordinary skill in the art to understand the invention. The FIGURES are schematic and not necessarily to scale. FIGS. 10, 12, 13, 14 and 15 illustrate laser systems having an optical resonator. In these figures, reference numerals in which the last two digits are the same indicate the same or similar components, whose description is not always repeated herein.

When considered in conjunction with the foregoing FIGURES, further features of the invention will become apparent from the following detailed description of non-limiting embodiments of the invention.

DETAILED DESCRIPTION

Figure 1:
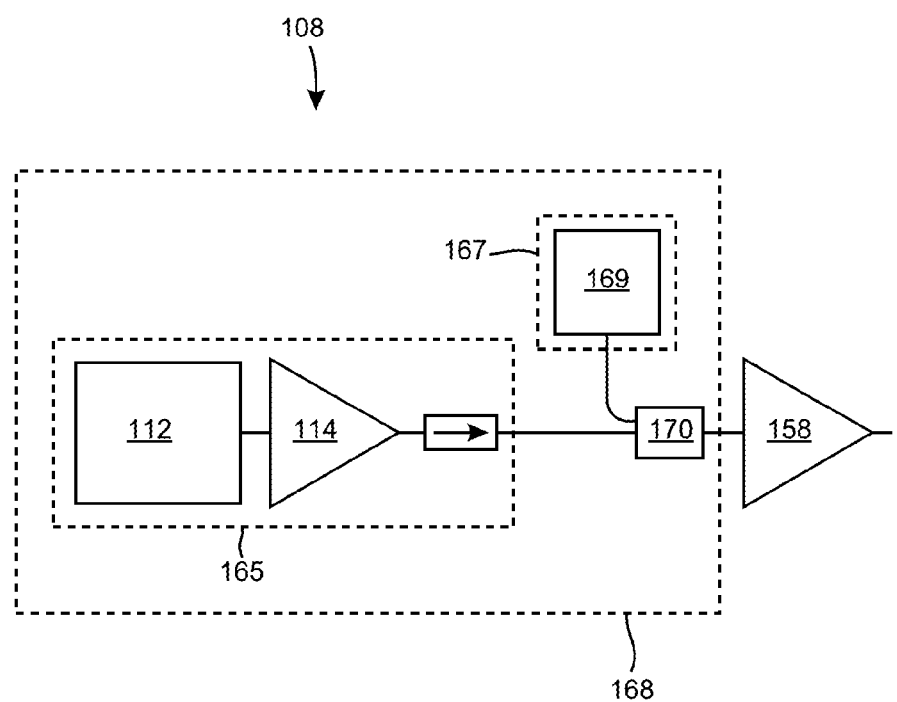
FIG. 1 schematically illustrates a fiber amplifier that can use a tapered active optical element according to one embodiment of the present disclosure.

FIG. 1 schematically illustrates an optical amplifying apparatus 108 that can comprise an input seed/pump section 168 and an optical amplifier 158. The optical amplifier 158 comprises a tapered gain element (TGE), which preferably comprises a length of rare earth doped (RED) tapered optical fiber (TOF). The optical amplifier 158 amplifies the input seed responsive to receiving the pump light, both of which may be provided to the amplifier 158 by the input seed/pump section 168. The input seed/pump section 168 can comprise an input seed section 165 that provides the input seed signal, a pump section 167 that provides the pump light and a combiner 170 that combines the pump and input seed signal for provision to the TGE amplifier 158.

The input seed section 165 can comprise any suitable input seed source. For example, the input seed section 165 and can comprise an oscillator 112, which can comprise a mode locked fiber oscillator as described elsewhere herein, and a downstream amplifier 114 and isolator.

The pump section 167 can comprise any suitable pump source 169. The pump section 167 can generate the pump light using a nonlinear process, such as, for example, a FWM process.

Preferably the pump source section 167 comprises a substantially single mode (SM) pump source, and amplifier 158 comprises a length of RED TOF that is preferably substantially core pumped (as opposed to substantially cladding pumped) with substantially single mode pump light from the pump source section 167. However, the RED TOF can be cladding pumped, and the TOF optical fiber can be few moded or MM along all or at least part of its length.

The pump source section 167 of FIG. 1 is shown in a co-pumping configuration with the TGE amplifier 158 and for illustrative purposes is shown as part of an input seed/pump section 168. However, the pump source section need not be part of an input seed/pump section. For example, the pump source section can be arranged to counter pump the TGE amplifier 158 from the output end of the TGE amplifier 158, in which case it would located to the right of the TGE amplifier 158 as shown in FIG. 1.

Figure 2A:
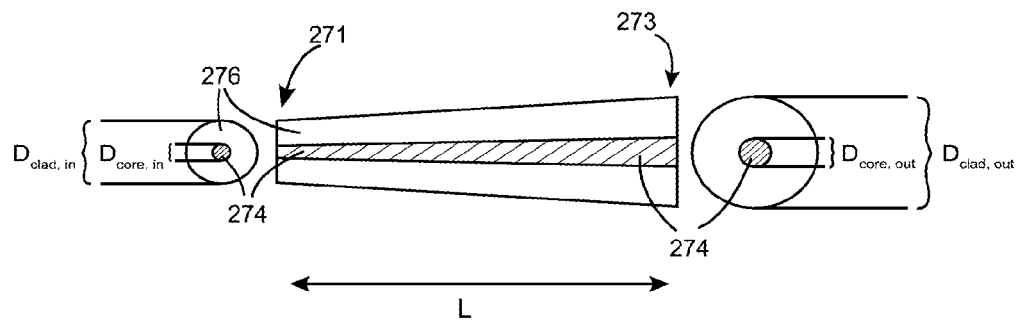
FIGS. 2A-2C schematically illustrates tapers for fibers of an optical amplifier or laser, such as the fiber amplifier of FIG. 1, according to the present disclosure.

With reference to FIG. 2A (and as can equally apply to FIGS. 2B and 2C) a TOF is preferably formed from a rare-earth doped optical fiber having a core that varies (e.g., increases) in diameter from the input end 271 along its length to the output end 273. In the simplest form of manufacture, not only does the core diameter vary, but so too does the outer diameter of the fiber along the length of TOF.

The length of the TOF can comprise some of the overall length of the RED fiber, at least a majority of its length, or substantially all of its length.

The length of TOF can have at its input end 271 a core 274 having a diameter $D_{core-in}$. The core 274 can have the larger diameter $D_{core-out}$ at the output end 273. The diameter of the core increases along at least some the length between the ends. The fiber can have a cladding 276 (which can be the first cladding after the core, where cladding refers to a region having an optical function of tending to confine light to a region the cladding surrounds) that also tapers. As shown in FIG. 2A, the cladding 276 can have a diameter at the input end 271 of $D_{clad-in}$ which can increase to a diameter at the output end 273 of $D_{clad-out}$. The input and output ends need not be transitions to free space. For example, one or both of the input and output ends can be locations selected along a length of fiber according to a criterion or criteria noted herein.

By way of example, a TOF according to the present disclosure can have a input/output taper ratio (ratio of a diameter at the output end to the diameter of the same region (e.g., the core) at the input end of the fiber of at least 1.5, at least 2, at least 2.5, or at least 3. In various practices the taper ratio can be between (inclusive of endpoints of the stated ranges) about 1.5 and about 2, between about 2 and about 3, or between about 3 and about 5. In various practices of the invention, the foregoing recitations regarding taper ratios can apply to $D_{core-out}/D_{core-in}$, or to the ratio $D_{clad-out}/D_{clad-in}$, or to both of the foregoing ratios. In terms of actual diameters of fibers, a tapered fiber can have a core having a diameter that tapers from, for example (again including endpoints), about 10 µm to about 20 µm, from about 10 µm to about 30 µm, from about 10 µm to about 40 µm, or from about 10 µm to >about 50 µm. The length of the TOF can be, in various practices of the disclosure, no greater than about 500 cm, no greater than about 250 cm, no greater than about 150 cm, no greater than about 100 cm, no greater than about 75 cm, no greater than about 50 cm, no greater than about 30 cm, or no greater than about 25 cm.

The length of the TOF, and particularly where TOF comprises and up/down taper as described herein, can be, in various practices of the disclosure, greater than about 5 meters, greater than about 10 meters, greater than about 20 meters, greater than about 50 meters, greater than about 75 meters or greater than about 100 meters.

Preferably the taper is configured such that the core is substantially single moded (where "mode" refers to transverse modes, as the skilled worker is aware) at the input end 271. The core can be "large mode area" (LMA) fiber at its input end (and along the length of the taper). LMA, for the purpose of this disclosure, can mean a core numerical aperture (NA) of about 0.11 or less at 1060 nm and a core diameter of at least 10 µm. In some practices, the core can have an NA of about 0.09 or less, again with a core diameter of a least 10 µm. In one practice, the fiber taper can have at it its input end a core diameter of 10 µm and can be single mode at the input seed wavelength, and preferably LMA (10 µm, 0.08 NA at 1060 nm) at the input seed wavelength, for example. However, this can equally be a smaller core or a larger core. The input end can also support more than a single mode.

The taper of the TOF may be configured such that the input beam quality does not substantially degrade along the length of the amplifier, even though the fiber tapers up in diameter such that the core can support higher order modes. In one practice, the length of TOF optical fiber is a single moded at its input end and the taper profile is such that although the core increases in diameter along the taper such that the core can support higher order modes, little or no optical energy is transferred into higher order modes. Accordingly, the length of TOF can provide an output that is substantially in a single transverse mode and that accordingly has good output beam quality. Beam quality can be measured and quantified according to the "M-squared" or "M2" parameter. As is explained in more detail below, the TOF can be single mode in operation, although the TOF can have a structure, starting along some length of the TOF, where the remainder of the length can in theory support the propagation of higher order modes.

The core diameter of a TOF optical fiber is preferably selected such that pulse-energy handling is not limited. However, equally, if an application does not require substantially single-transverse mode operation, then taper and/or the output diameter can be such that the beam quality is not maintained throughout the amplifier.

Figure 2B:
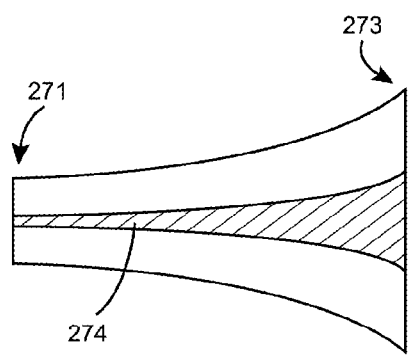
Figure 2C:
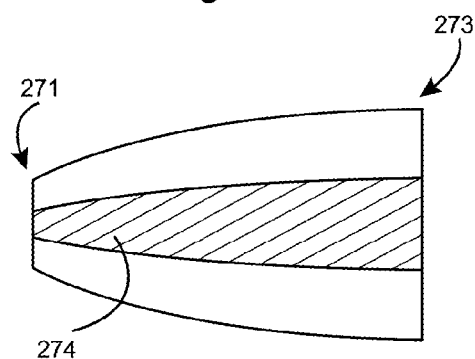

The profile of the taper can be substantially linear along the length. FIG. 2A schematically illustrates a linear taper. A taper can equally have a nonlinear or arbitrary taper profile. The taper can increase substantially exponentially along the length, as shown in FIG. 2B, or can have a taper wherein the rate of taper is reduced along the length of the TOF, as is shown in the example of FIG. 2C. The taper profile along the length of the fiber can be designed for improving, including optimizing, the performance of the amplifier in terms of nonlinearity and gain. For example, the effective nonlinear length of an amplifier is defined by both the core-size and the gain profile along the fiber length. By having a non-uniform taper profile (as, for example, is shown in FIG. 2B), the effective nonlinear length of the amplifier can be very short, since the highest gain of the amplifier occurs at a region of the fiber where the mode field is largest. The rate at which the mode field evolves along the length of the fiber can also affect beam properties of the amplified signal.

Figure 3:
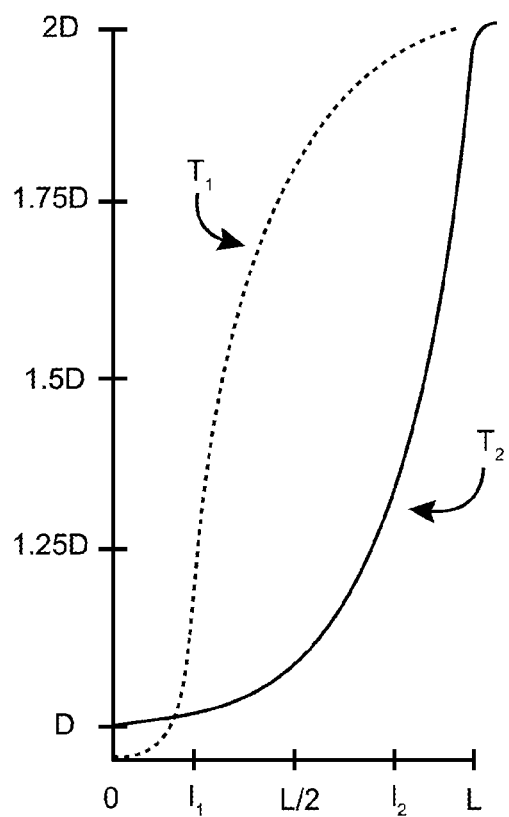
FIG. 3 schematically illustrates examples of taper profiles for a tapered active optical element according to the present disclosure.
Figure 9:
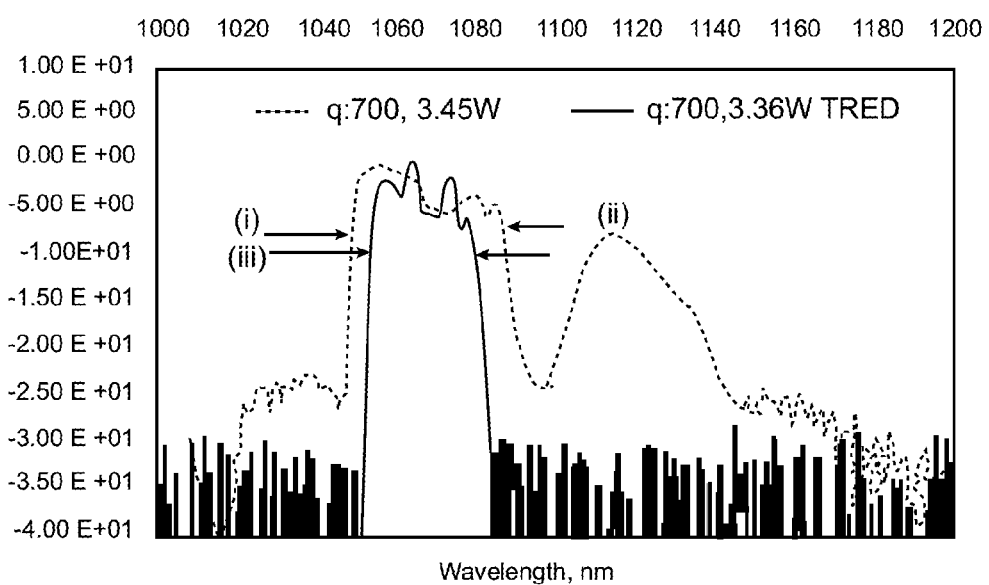
FIG. 9 illustrates an optical spectrum of an embodiment of the invention in comparison to a prior art device.

FIG. 3 schematically illustrates examples of taper profiles T1 and T2 for a tapered active optical element (e.g., a RED TOF) according to the present disclosure. Increase in diameter is plotted as a ratio versus the proportion along of longitudinal distance along the taper length in term of the total length L of the taper The tapers T1 and T2 shown in FIG. 9 are both nonlinear, can represent the diameter of the core of a TOF. For taper T1, the magnitude of the rate of change of the diameter of the core with respect to longitudinal length at a first location $l_1$ nearer the input (and hence having a smaller diameter) is greater than the magnitude of the rate of change of the diameter of the core with respect to longitudinal length at second location $l_2$ along the tapered length, where the second location is nearer the output end and hence has larger diameter. For taper T2 the opposite is true: the magnitude of rate of change of diameter of the core with respect to longitudinal length along the taper is less at location $l_1$ than at location $l_2$.

An amplifying optical device according to a practice of the invention can include a tapered gain element for providing gain where gain element, in a direction starting from the input end, includes an "up" taper, wherein a diameter of the gain element increases, followed by a "down" taper, where the diameter of the gain element then decreases. For example, such an up/down taper can include two of any of the TOF's shown in FIGS. 2A-2C (and can include taper profiles as shown in FIG. 3) where the two "output" ends as previously described are in optical communication such that the input end of the up/down TOF is the input end of one of the tapers shown in FIG. 2 or 3 and the output end of the combined up/down taper is what would have been previously described as the input end of the of the other of the tapers, which is now arranged as a "down" taper.

Figure 4:
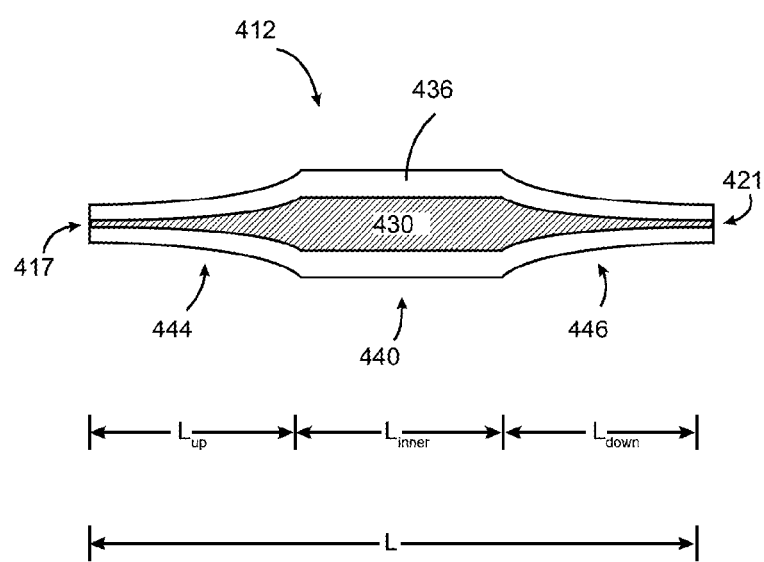
FIG. 4 schematically illustrates an example of an "up-down" taper according to one practice of the present invention.

FIG. 4 schematically illustrates an example of an "up/down" taper 412 according to one practice of the present invention. The up/down taper 412 extends from the input end 417 to the output end 421. The up/down taper can comprise an active (e.g. RED) TOF having a core 430 and a cladding 436. As shown in FIG. 4, the up/down taper can include a middle section 440, which may be substantially untapered, interposed between the "up" taper 444 and the "down" taper 446.

Such an up/down TOF 412 may have two taper ratios—for example, a taper ratio of the a diameter at the output end 421 (e.g., a diameter of the core 430) to the diameter of the same region at the input end 417, as well as a taper ratio of the maximum diameter of the region along the taper to the minimum diameter of that region (e.g., the core 430). The max/min ration will typically be larger than the output/input ratio. For example, in various practices of the invention, the max/min ratio may be at least 5 times, at least 4 times, at least 3 times, or at least 2 times the output/input ratio. In various practices of the invention the output/input ratio is no greater than 3; no greater than 2.5, no greater than 2; no greater than 1.5; or no greater than about 1.25. In one practice the output/input ratio is about 1. In various practices of the invention any of the foregoing output/input ratios can be combined with any of the foregoing max/min ratios.

The overall length L of the TOF shown in FIG. 4 can be any of the overall lengths noted above in the discussions of FIGS. 2A-2C. In some practices the overall length can be twice that of those noted in conjunction with the description of FIGS. 2A-2C as the TOF of FIG. 9 include both "up" and "down" tapers, (or even 2.5 or 3 times, to account for various lengths of $L_{inner}$). The lengths of $L_{up}$ and $L_{down}$ can be, but need not be, substantially the same. In various practices of the invention, the ratio of the length over which a diameter decreases (e.g., a diameter of the core region) to the length over which the diameter increases can be about 1, not greater than 0.075, not greater than 0.67, or not greater than 0.5. In other practices, the foregoing can apply to the ratio of the length over which a diameter increases to the length over which the diameter decreases.

In one embodiment, the TOF device is in operation able to guide only a single mode of the waveguide, even though the waveguide properties of the inner region can in theory support higher order modes (V number greater than 2.405). The TOF device can be spliced at its input and output to single mode optical fibers with minimal optical splice loss, even though the fiber device has at least one region along its length in which the fiber waveguide has capability of supporting more than the fundamental mode, the transition from single mode to multimode is slow enough (adiabatic) so that the higher order modes are not excited. Preferably the device has an input tapered region from single mode fiber at the device input to multimode fiber and an output tapered region from multimode fiber to single mode fiber at the output.

As is discussed in more detail below, a TOF device can be manufactured on the draw during the fiber fabrication process. However, this device can be manufactured post-drawing of the fiber by using tapered mode-converters at both the input (Up converter) and output end (down converter) of the fiber in which the region of multi-mode operation occurs. Preferably the multi-mode length of fiber is continuous and uniform in waveguide properties. Preferably the length of the multi-mode region of fiber ($L_{inner}$) is more than twice the length of the tapered sections of fibers, and preferably $L_{inner}$ is more than 1 m in length.

Figure 5:
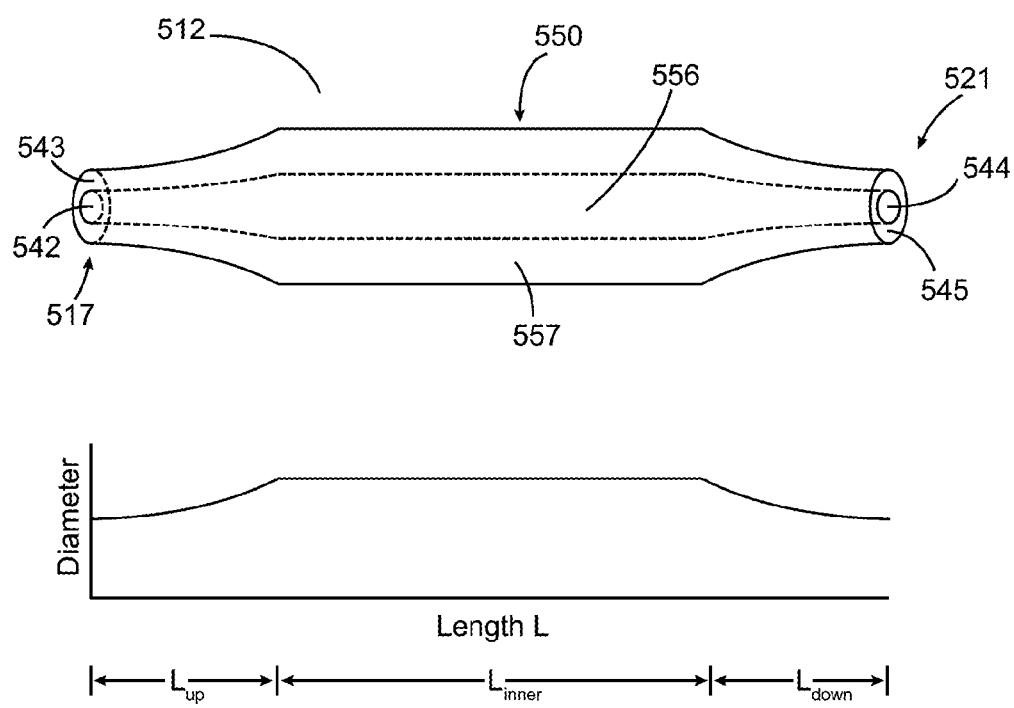
FIG. 5 shows another example of an up/down taper according to embodiments of the invention.

FIG. 5 schematically illustrates a TOF device such as described above conjunction with FIG. 4, with the following features. The fiber device 512 comprises an input end 517 having an input core section 542 and cladding section 543 providing waveguide properties that support only a single mode (the fundamental mode) at a signal wavelength, and an output end 521 with the output core section 544 and output cladding section 545 providing waveguiding properties such that only a single mode is supported at the signal wavelength. Furthermore the central or inner region 550 of the device has a core section 556 with a diameter larger than the input core section 542 and output core section 544 and wherein the central waveguide formed by core 556 and cladding 557 provides a structure that would support more than a single waveguide mode at a signal wavelength.

In one practice, the input end of a TOF device can have cladding diameter of 100 μm, a core diameter of 10 μm and numerical aperture of approximately 0.08, supporting a single optical mode at 1064 nm signal wavelength. The outer diameter of the fiber can increases to 500 μm over a length of approximately 0.5 meters, resulting in a maximum core diameter of approximately 50 μm and a numerical aperture of 0.08. The TOF device cladding diameter is maintained at approximately 500 μm for 2.5 m along its length, after which it tapers down to an output end having cladding diameter of 100 μm and core diameter 10 μm, with numerical aperture of 0.08, supporting a single waveguide mode at the output. The down-taper section of this device has a length of approximately 0.5 m.

The entire length of the TOF device can be fabricated from a single optical preform during the fiber drawing process and the entire device remains coated along its length, where the coating is applied to the fiber during the drawing process. It will be appreciated that the relative cladding diameters between input, output and central regions of the device can be different from those described within the specific example above. It will also be appreciated that the device can be manufactured from a single 500 μm diameter length of fiber, with input and output tapers fabricated at the fiber ends during a process step or steps after the 500 μm diameter fiber has been fabricated. It will also be appreciated that the input and output tapers can be fabricated separately and subsequently spliced to a uniform length of large diameter fiber to produce the device. It will also be appreciated that the relative and absolute lengths of the up-taper, down-taper and central sections of this device can be selected subject to the requirements of a given application.

In some examples, the TOF device of FIG. 5 has a total length L of at least 20 m, or at least 50 m, or at least 75 m, or at least 100 m, of which the central section of substantially uniform diameter constitutes at least 95%, or at least 97%, or at least 99% of the overall device length. In another example, the length L is approximately 4 m, with the central region having a core diameter of 100 μm and cladding diameter of 1 mm over a length $L_{inner}$ of 3.5 meters, with the up- and down-taper sections measuring only 0.25 m in length, having single mode 6 μm core (0.1 NA) and 10 μm (0.08 NA) waveguide at the input and output ends of the device respectively.

Figure 6:
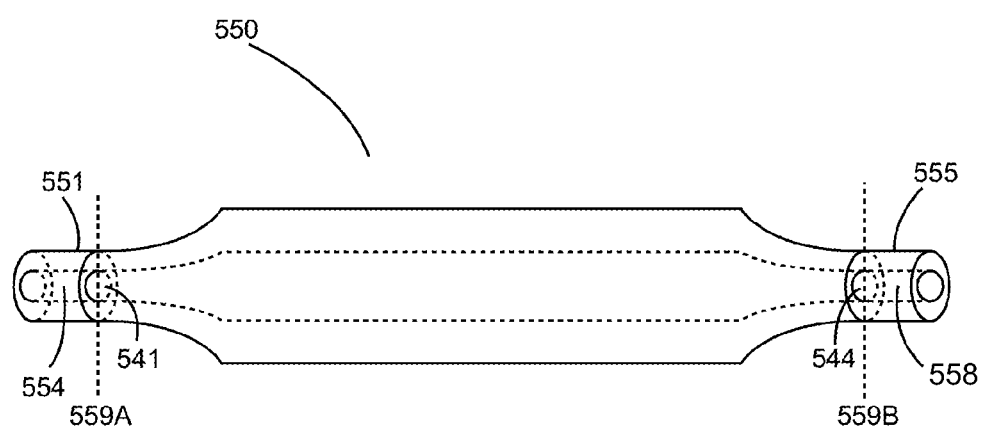
FIG. 6 shows another example of an up/down taper according to embodiments of the invention showing input and output sections.

FIG. 6 illustrates another example of a TOF device as shown in FIG. 4 or 5, illustrating elongated input and output single-mode fiber sections, respectively 551 and 555. The input single mode fiber section 551 can be the output delivery fiber from an upstream element or component or module of an optical system and the output single mode fiber 555 can be the input delivery fiber to a downstream element, component or module of an optical system.

The input fiber 551 is spliced to or connected to the input single-mode end 541 of the device at a splice or connection 559A and the output fiber 555 is spliced or connected to the output end 544 of the device at an output splice or connector 559B. In this example, the input fiber waveguide structure (core 554 size and NA) is preferably substantially similar to the input waveguide structure (core size and NA) of the device to minimize optical loss at the splice or connection. Similarly the output fiber waveguide structure (core 558 diameter and NA) is preferably substantially the same similar to the output waveguide structure (core diameter and NA) of the device to minimize optical loss at the splice or connection.

The TOF devices described above can be doped with REDs. However, they can also comprise substantially passive devices, where little or no gain is provided, such as, for example, because the dopants used to form the fiber waveguide device are largely devoid of, or do not include, rare earth elements and provide little or no optical gain to a transmitted signal if or when pumped by pump light of a typical pump wavelength for RED fiber lasers and amplifiers. Substantially passive TOF devices can find use, such as, for example, being incorporated into resonators, such as cavity of a laser.

In other examples, the TOF device can be doped with one or more rare earth ions to make the device active and capable of providing optical gain for a transmitted signal when pumped by laser light at a pump wavelength. In this example, the device preferably has a double-clad waveguide structure with the device, for example FIG. 5 having a coating along its length having refractive index lower than the inner cladding of the fiber. Preferably the device has a rare-earth dopant comprising Ytterbium to a sufficient concentration that the pump absorption at a pump wavelength exceeds 2 dB per meter.

Figure 7A:
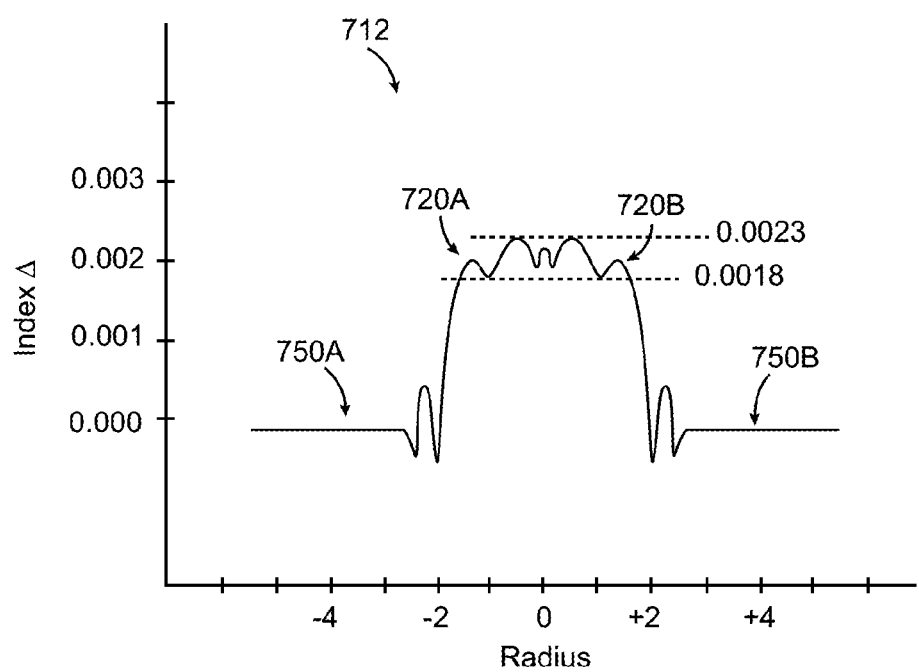
FIG. 7A schematically illustrates a refractive index (RI) profile for consideration as regards a tapered optical fiber (TOF) according to the present disclosure.
Figure 7B:
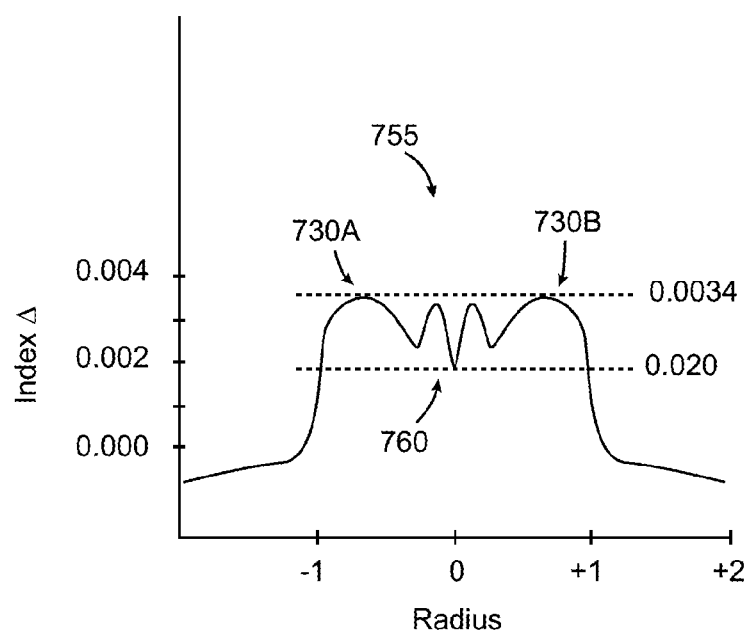
FIG. 7B schematically illustrates another refractive index (RI) profile for consideration as regards a TOF according to the present disclosure.
Figure 7C:
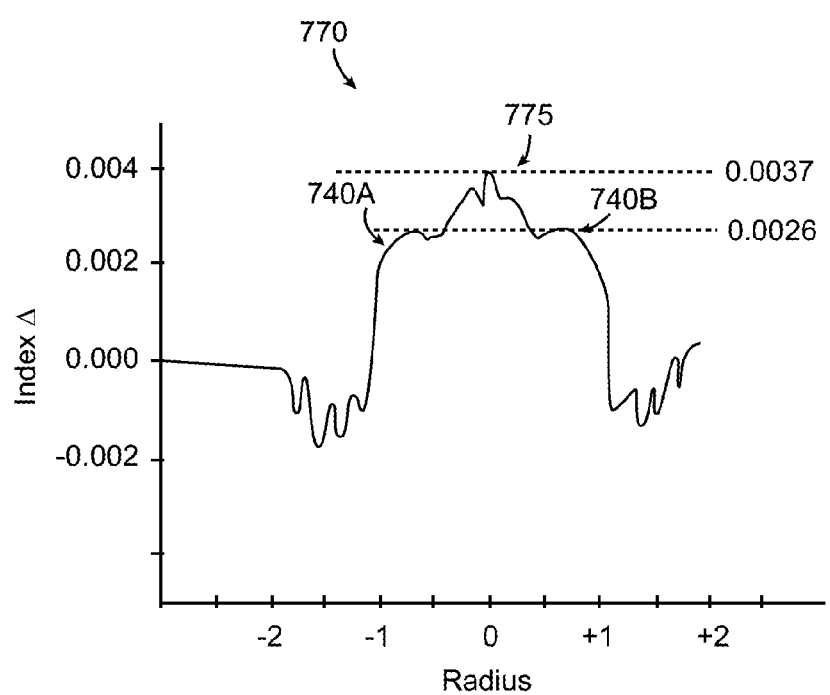
FIG. 7C schematically illustrates yet a further refractive index (RI) profile for consideration as regards a TOF according to the present disclosure.

It is preferred that a tapered optical element, such as TOF, have a substantially uniform refractive index profile in the central region, so as to avoid concentration of optical energy and possible attendant generation of nonlinear affects (e.g., more power at the first Raman stoke shift) or more power into higher order modes. FIGS. 7A-7C show possible refractive index (RI) profiles for fibers considered for fabrication of RED TOFs for use for amplifying optical signals. The RI profile plots the difference between the RI at a location and the RI of pure silica (typically the cladding comprises pure silica), not the absolute value of the RI of the core region (which is typically doped silica, and hence can be in the region of 1.45 at a wavelength of 1 micron).

FIG. 7A shows an example of a preferred RI profile 712, while FIGS. 7B and 7C show less preferred core RI profiles. The section of the RI profile corresponding to the core can be identified as the region between the shoulders 720A and 720B in FIG. 7A, between the shoulders 730A and 730B in FIG. 7B, and between the shoulders 740A and 740B in FIG. 7C. With reference to FIG. 7A, the sections of the RI profile 712 corresponding to the cladding disposed about the core are identified by reference numerals 750A and 750B; similar sections are shown in FIGS. 7B and 7C though not specifically identified by reference numerals.

Though it is preferable that the RI profile of the core be as uniform as possible, it is understood that in any practical fiber there will often be variations. With reference to FIG. 7A, one measure of the variation is the percentage variation according to the formula for the maximum and minimum variation within the core section of (max RI−min RI)/(2× min RI)×100. By this measure, the core of FIG. 5A has a percentage variation of [(0.0023−0.0018)/(2×0.0018)]×100 of about 11%. Using the same formulation, the core RI profiles of FIGS. 7B and 11C have variation of, respectively, about 35% and about 21%.

In various practices of the invention, the variation of the RI within the core, as determined in percentage terms by the foregoing formula, is preferably is no greater than about 20%. More preferably the variation is no greater than about 15%, and most preferably the variation is no greater than about 11%.

Percentage variation in RI profile does not fully demonstrate the differences between the RI profiles of FIGS. 7A, 7B and 7C. Note that whereas FIG. 7A show a core RI profile having a ripple in between the shoulders 720A and 720B, the RI profile 755 of FIG. 7B shows a core section having a generally depressed section 760 relative to the shoulders 730A and 730B and the RI profile 770 of FIG. 7C shows a core section having a generally raised inner section 775 between the between the shoulders 740A and 740B bounding the core. The depressed inner region 760 can result from dopant burn-off during collapse of an MCVD preform from a tube to a solid rod. This burn-off can be compensated by flowing appropriate dopants through the center of the tube, however over compensation can generate the raised region 775. A measure, in percentage terms, of the maximum magnitude of the variation of the RI profile from a shoulder of the core relative to the shoulder RI can better quantify the presence of the depressed or raised region in the RI profile of the core. It is most desirable that variation in RI as determined by the foregoing criterion, is no greater than about 30%, or more preferably no greater than about 25%, or more preferably no greater than about 15%. For the RI profiles shown in FIGS. 7A-7C, the variation is according to this criteria estimated to be about 11% for FIG. 7A and about 41% for FIGS. 7B and 7C. As an example of the calculation, the shoulders of FIG. 7B have an RI of about 0.0034. The maximum magnitude of the variation is absolute value [0.0020−0.0034]=0.0014 and the percentage variation relative to the shoulder is [(maximum magnitude)/0.0034]×100=about 41%.

RI profiles are typically taken at a wavelength of about 633 nm.

Tapering fibers is known, particularly in the manufacture of couplers. Tapered double clad (DC) fibers are also known. A tapered DC fiber can be tapered as it is drawn from a draw tower. The speed of the fiber draw process is varied during the draw process, such that the diameter of the resulting fiber changes along the length of fiber. See for example PCT WO2009043964A. See also *Double Clad Tapered Fiber for High Power Applications*, V. Filippov et al., Optics Express, Vol. 16., No. 3, 4 Feb. 2008, pp. 1929-1944.

As previously described, DC fibers are not always ideal and can typically only be used in relatively long lengths (>1 m) due to absorption limitations–the absorption of the amplifier is dependent on the cross-sectional ratio of the RED core and inner cladding. In addition, tapering fibers during the draw process is difficult, requiring modification of the draw speed very quickly. The speed of this process change generally limits the length of the taper to a minimum of about a couple of meters.

Using a core-pumped approach, the absorption is high and the fiber length can be very short (as already mentioned). Furthermore, core-pumping, unlike cladding pumping, need not require an optical-quality outer surface of the fiber. This is important for tapering since it allows the use of post-fiber-fabrication tapering procedures, wherein the fiber is drawn and coated, and subsequently the fiber coating is removed and the fiber tapered, before re-coating.

The post draw process may include heating the fiber in a flame or plasma or heated crucible, while applying a tensile force to stretch the fiber in a controlled way. Long (>a few mm) tapers can be produced by traversing a flame along the fiber while applying tension. Applying a non-uniform tension over time allows control of the taper profile along the fiber length. Using this approach, tapers can be controlled and made over lengths from a few mm to greater than 1 m, therefore it is an ideal approach to producing a TOF over very short (<0.5 m) lengths. As an example, an Yb-doped fiber (preferably fabricated using a phosphor-silicate or alumina-phosphor silicate host material in the core for enhanced robustness to photodarkening, is fabricated in a conventional way. The fiber has a core diameter of 40 µm, cladding diameter of 400 µm, and a numerical aperture of approximately 0.08. In theory, the fiber can support several modes within the operative bandwidth of Yb.

After fabrication, the protective coating and/or cladding (typically a polymer) may be stripped from a length of the fiber. Some fibers used a combined protective coating/cladding, and often in such a case the protective coating has a lowered index of refraction such that it can serve as a pump cladding. Stripping this protective coating can also be considered as stripping the second cladding. Other fibers may have separate protective coatings and claddings, such as, for example, a polymer protective coating over a glass first cladding. In this case the protective coating is stripped and the cladding left intact. An all glass fiber may not require any stripping of a coating/cladding at all.

After any stripping operation, the fiber is tapered by applying a tensile force while traversing the flame along the fiber length. The tension applied as a function of time, is chosen to produce a uniformly-tapered fiber with a profile as shown in FIG. 2A. For example, the fiber can be tapered over a length of 30 cm to a diameter of 100 µm. The fiber can recoated with cladding or a protective coating after the post draw tapering process. The fiber can fabricated into an amplifier, having an input fiber with 10 µm core, 100 µm diameter and core NA of 0.08, supporting only a single transverse electric mode. The outer diameter can increase along the 30 cm length to 400 µm at the amplifier output, wherein the core diameter is 40 µm, with NA of 0.08.

Such TOF device, such as RED TOF amplifier, can have very low nonlinearity and, since the change in fiber core size is gradual, the single mode of operation is maintained along the length of the amplifier. The fiber can be re-coated and can be packaged to be linear or coiled, depending on the required application.

Thus in one embodiment, there is provided an up/down TOF optical amplifier comprising a single mode RED optical fiber pumped by one or more pump laser diodes said RED optical fiber having an input end and an output end, both of which can be spliced to single mode optical fibers with minimal optical splice loss and wherein the TOF device has at least one region along its length in which the fiber waveguide has capability of supporting more than the fundamental mode. However, the amplifier remains single mode, as in operation higher order modes are not excited due to one or both of the up/down tapers to single mode. This single mode optical amplifier is preferably configured within a master oscillator power amplifier (MOPA) configuration, where the MOPA preferably delivers short or ultrashort pulses and wherein the up/down TOF amplifier provides single-mode amplification with reduced optical nonlinearity over single mode amplifiers with uniform waveguide parameters along its length. As the skilled worker can ascertain from the disclosure herein, the such single mode amplifier can be single clad as well double clad, and core pumped as well as cladding pumped.

Figure 8:
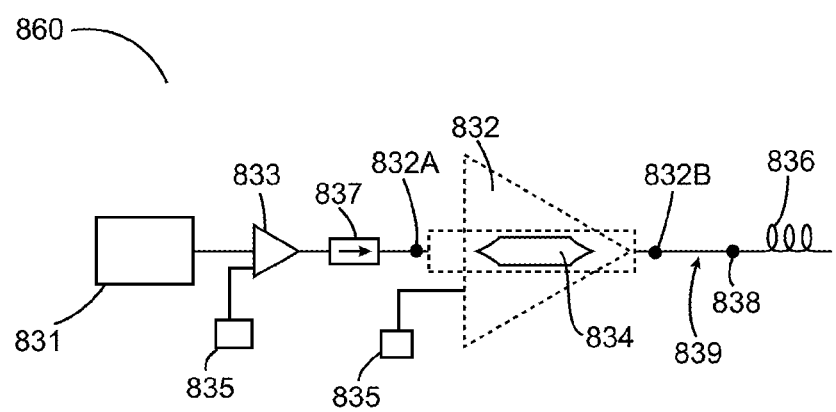
FIG. 8 schematically illustrates a master oscillator and amplifier arrangement according to the present invention where the amplifier includes a TOF including an up/down taper.

FIG. 8 schematically illustrates an example of a modelocked MOPA incorporating a TOF device, such as, for example, and up/down TOF device such as illustrated in FIGS. 4-6. The MOPA can deliver ultrashort optical pulses, typically below 100 picoseconds in duration. However, such a system can also be used to generate continuous wave light and nanosecond (>100 ps) optical pulses. The optical fiber amplifier 832 comprises a RED, single-mode up/down TOF device 834, such as shown above in FIG. 6, having single-mode input waveguide and single mode output waveguide, with a very large mode area central section having waveguide parameters (core size, numerical aperture, etc.) which would ordinarily (based on V-number alone) allow for the excitation of higher order waveguide modes.

The MOPA 860 comprises a passively modelocked optical fiber oscillator 831 which delivers pulsed light at a wavelength of 1064 nm with pulses of between 1 picosecond in duration and 100 picoseconds in duration, at a pulse repetition rate in the region of tens of MHz and average powers of a few mW (pulse energy in the range of tens of pJ). The output of the oscillator passes into an Ytterbium doped, double-clad optical fiber pre-amplifier 833 which is pumped by a multi-mode laser module 835. The pre-amplifier 833 amplifies the oscillator output to approximately 100 mW average power and a corresponding pulse energy of the order of 5-10 nJ, with peak power in the region of 1 KiloWatt.

After passing through an optical isolator 837, the pre-amplifier output is injected into a double clad Ytterbium-doped fiber power amplifier 832 comprising an up/down TOF pumped by another multimode pump laser module 835. The output fiber of the isolator 837 is a single mode fiber with core diameter approximately 10 μm and numerical aperture approximately 0.08. The up/down TOF double clad amplifier in this example can comprise a up/down TOF as showing in FIGS. 4-6. By way of example, the power amplifier comprises a fiber of geometry similar to FIG. 5 of this present invention although it will be appreciated that a device similar to FIG. 4 or 6 can also be utilized.

The total length L of the device is 3.3 m long comprising; a 2.3 m long central uniform section (550 in FIG. 5) having outer diameter of 250 μm and core diameter of 20 μm (resulting in a mode field diameter of approximately 18 μm) and input and output tapered sections, each of 0.5 meters in length, resulting in input and output cladding diameters (543 and 545 respectively) each of 125 μm and input and output core diameters (542 and 544 respectively) each of 10 μm. The numerical aperture of the waveguide throughout the fiber is approximately 0.08 resulting in a single mode input and single mode output fiber section of the amplifier device.

The amplifier TOF device in this example is fabricated during the fiber drawing process as a single homogenous piece of fiber, ensuring that the transition from the single mode input to the very large mode area central section and the transition from the central section to the single mode output fiber is smooth and therefore does not promote the coupling of energy from the fundamental mode of the single mode input fiber to higher order modes of the central region of the fiber and as a result, maintains a low-loss transition at the output end of the device. It will be appreciated that this amplifier device can also be fabricated post-fiber draw, by splicing tapered sections of fiber at both the input and output end of the central region of the amplifier.

The output of the isolator 837 is connected to the input of a pump-signal combiner (not shown) which can be a single-clad wavelength division multiplexer (WDM) or a double-clad single-mode plus multimode pump combiner such as a tapered fiber bundle or side-coupler commonly available from companies including Gooch and Housego and ITF for example).

In this specific example, a double-clad tapered fiber bundle is used to combine the signal from the isolator 837 and the pump light from the multimode pump laser module 835. The output of the pump combiner is a double clad fiber having core and cladding parameters (diameter and NA) matched to those of the input of the up/down TOF amplifier device 832 already described. The output of the pump combiner is spliced at 832A to the input of the amplifier device with low loss for both the signal and pump light. The dopant concentration of Yb in the core of the amplifier device is such that the double clad fiber has a pump absorption of 2.5 dB per meter when pumped with multi-mode laser diodes at 915 nm wavelength. The total pump absorption of this amplifier is in the region of 8 dB.

The output of the double clad amplifier fiber is spliced at 832B to a passive, single-clad optical fiber with 5 μm radius core and NA of 0.08, making it well matched to the Yb-doped fiber and therefore having very low loss at the splice 832B.

This particular MOPA is suited to generation of optical supercontinuum within photonic crystal fiber (PCF), also known as holey fiber or microstructured optical fiber. In the example of FIG. 8, a length of PCF 836 with zero dispersion wavelength approximately 1 μm and anomalous dispersion at the amplifier signal wavelength of 1064 nm, generates spectral broadening and supercontinuum generation due to nonlinear interaction between the amplifier pulsed laser source from the amplifier 832. In this example, the PCF 836 is spliced at 838 to the passive fiber 839. The single mode nature of the passive fiber makes possible a low splice loss to the PCF.

FIG. 9 shows the two spectra—that of a prior art amplifier (dashed curve) and an amplifier as per this invention (solid line)—where both amplify ultrafast pulses to nominally the same peak power. The dashed curve is the optical spectrum of the pulses from a prior art MOPA at the output of the amplifier (i.e., amplifier 832, but with a uniform fiber instead of up/down TOF) at an average power of approximately 3.4 Watts, a pulse repetition rate of 20 MHz (pulse energy 170 nanoJoules) and a peak power in the region of 35 kiloWatts. More particularly, in the case of the prior art MOPA, the design is as shown in FIG. 8 except that the power amplifier 832 comprises a 3.3 m long single-mode, Yb-doped double clad fiber, with uniform outside diameter along its length. In this specific example, the Yb-doped fiber has an outer diameter of 125 μm and a core radius of 5 μm with a numerical aperture of approximately 0.08 rendering it single mode at 1064 nm. The dopant concentration of Yb in the core is such that the double clad fiber has a pump absorption of 2.5 dB per meter when pumped with multi-mode laser diodes at 915 nm wavelength. The total pump absorption of this amplifier is in the region of 8 dB. The output of the double clad amplifier fiber is spliced 832B to a passive, single-clad optical fiber 839 with 5 μm radius core and NA of 0.08, making it well matched to the Yb-doped fiber and therefore having very low loss at this splice.

The solid curve shows the an example of the optical spectrum of the pulses from the MOPA at the output of the amplifier 832 including the up/down TOF also at an average power of approximately 3.4 Watts, a pulse repetition rate of 20 MHz (pulse energy 170 nanoJoules) and a peak power in the region of 35 kiloWatts.

The prior art dashed line spectrum shows distinct features. As can be seen at (i), the input signal pulse is centered at 1064 nm with narrow bandwidth and this has broadened during amplification due to self-phase-modulation (SPM). As can be seen at (ii), the peak power in this amplifier is sufficiently high to significantly exceed the threshold for stimulated Raman scattering (SRS) and the spectrum shows the first Stokes component at a wavelength of approximately 1020 nm.

In generating supercontinuum or in delivering pulses for materials processing, the presence of the Stokes spectral components is undesirable since this component of the pulse (in the dashed line example this is a reasonable percentage of the total pulse energy) does not contribute significantly to the supercontinuum generation process and can have deleterious effects on any materials processing applications. The peak power that can be delivered with the prior art amplifier has significant disadvantages.

In summary, clearly, in the case of the uniform fiber, prior art amplifier the nonlinear effects are significantly larger than those of the up/down TOF amplifier. This is shown by the presence of spectral component at 1120 nm (ii) due to stimulated Raman scattering as well as the significantly broader signal pulse (i) compared to that of the solid curve of the tapered amplifier as per this invention (iii) due to a larger amount of nonlinearity (self phase modulation)

It will be appreciated that the level of nonlinearity in the amplifier of this present invention can be further reduced by increasing the core mode-field diameter of the central region or inner region of the TOF amplifier device of FIGS. 4-6 utilized within the MOPA of FIG. 8. For example, by having a 500 μm cladding, 40 μm core, the mode field diameter in the fundamental mode can be substantially increased, vastly reducing the impact of nonlinear effects during amplification within the amplifier.

The reduced nonlinearity provided by the invention can provide major benefits in enabling delivery of clean optical pulses with higher optical peak power. This has advantages in many specific applications, including by way of example, supercontinuum generation, in particular by minimizing nonlinear effects such as SRS generation, the supercontinuum generation process becomes increasingly more efficient. There are also benefits in Four Wave Mixing (4 WM) generation in photonic crystal or microstructured optical fibers—4 WM requires a narrow spectral bandwidth of the pump laser in order to efficiently exploit parametric processes within the nonlinear fiber. By minimizing spectral broadening due to self-phase modulation, the amplifier device of this invention allows for the delivery of higher peak powers for a given spectral linewidth, thus increasing 4 WM system efficiencies. Finally, there can be advantages for nonlinear frequency conversion including second harmonic, third harmonic, etc. Harmonic generation in nonlinear crystals typically require a narrow spectral linewidth in order to maximize conversion efficiency. The novel amplifier device of this invention allows for vastly reduced nonlinear effects, enabling higher peak powers to be delivered to the nonlinear crystal for a given spectral bandwidth of the pulses.

In another embodiment of the invention, a TOF device, such as an up/down TOF device, is utilized within an optical fiber laser cavity in order minimize nonlinear optical effects within the laser cavity.

Figure 10:
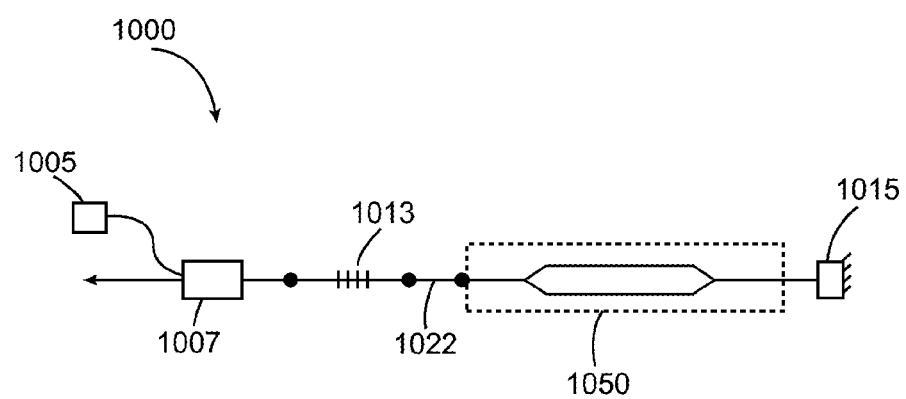
FIG. 10 schematically illustrates an embodiment wherein an optical resonator includes a TOF including an up/down taper.

FIG. 10 is a schematic representation of a passively modelocked fiber oscillator device. The passively mode-elocked fiber oscillator 1000 comprises a single mode pump laser diode 1005 operating at approximately 976 nm, delivering up to 300 mW average power and coupling light into the cavity via a fiber wavelength division multiplexer (WDM) component 1007. The cavity or resonator comprises two end reflectors—a chirped fiber Bragg grating (CFBG) 1013 and a semiconductor saturable absorber mirror (SESAM) 1015, where the SESAM has the dual role of forming a cavity end reflector and an intensity discriminator which enables and maintains the formation of the short pulse within the cavity. The cavity further comprises a length of single-clad Yb-doped optical fiber 1022 which provides gain within the laser cavity, and a low nonlinearity up/down TOF device 1050 which makes the cavity the desired length to produce a fixed pulse repetition rate for the cavity, which is inversely proportional to the distance between the CFBG and SESAM end reflectors (the cavity length).

Some discussion of operation of the cavity is of use. The cavity produces ultrashort optical pulses at a wavelength determined by the reflectance spectrum of the CFBG 1013, which fits within the spectral gain bandwidth of the Yb-doped fiber gain material 1022. The pulse width of the cavity is determined by a number of parameters including the dispersion of the CFBG and the response time of the SESAM.

Pulse duration $\tau$ in mode-locked fiber lasers is largely dictated by intracavity dispersion $D_{net}$ and in first approximation $$\tau \sim D_{net}^{1/2}.$$

For reliable self-starting the laser should operate in the regime of anomalous dispersion and therefore for operation in the 1064 nm spectral range one has to use dispersion compensation to bring net intra-cavity to a positive value (anomalous dispersion). In many cases a chirped fiber Bragg gratings (CFBG) acts as a dispersion compensator and therefore net dispersion can be written as $$D_{net} = z_c D_f + D_{CFBG},$$

where $z_c$ is the cavity length in meters, $D_f = -40$ fs/(m nm) is fiber dispersion (in the 1064 nm spectral region). When net dispersion of a laser cavity is anomalous then the laser produce optical solitons—nonlinear pulses with strong relation between peak power and pulse duration which can be written as $$I_p \tau^2 = \text{Const.}$$

Where $I_p = P_p/A_{eff}$ is pulse intensity, $P_p$ is peak power and $A_{eff}$ is effective core area. From last relation it becomes clear that net intracavity dispersion controls not only pulse width but also peak power and the longer the cavity the lower peak power required to maintain stable mode-locking (because dispersion of CFBG is usually greater than fiber dispersion). What is also clear is that the greater the effective mode area the greater the peak power of the generated pulses and thus for given pulse intensity LMA fibers offer certain advantages since it allows to achieve stable mode-locking at lower repetition rates.

Figure 11:
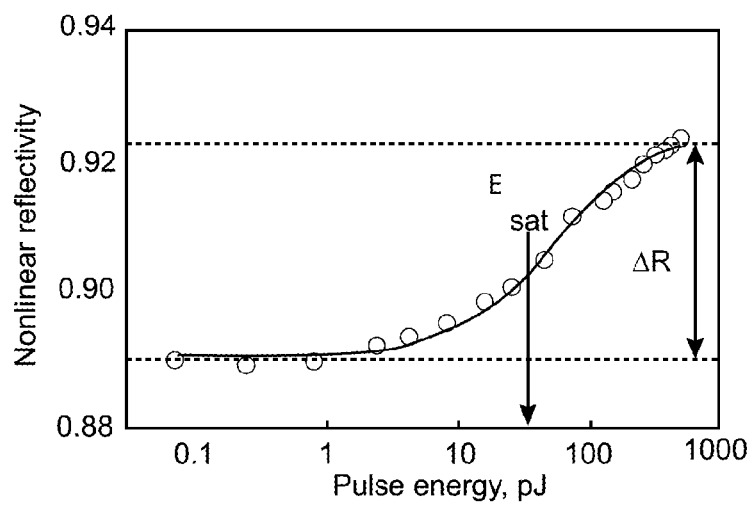
FIG. 11 is plot of the reflectivity versus pulse energy for a saturable absorber showing a nonlinear response.

When a mode-locking mechanism is based on SESAM technology, the intensity of the generated pulses should be high enough to saturate (bleach) the semiconductor absorber as it is illustrated in FIG. 11 below where $E_{sat} = P_{sat} \tau$, and for reliable mode-locking $P_p$ should be greater than $P_{sat}$ but not too much otherwise it could result in unwanted effects.

Furthermore, the peak pulse intensity may also be limited by the onset of non-linear effects such as self-phase modulation. Self-phase modulation $\phi_{n1}$, may be calculated according to:

$$\Phi_{nl} = \frac{2\pi n_2 PL}{\lambda A} \leq \pi$$

Self-phase modulation nonlinear phase shift, $\phi_{n1}$ is a function of the non-linear refractive index $n_2$, which in silica optical fibers is $n_2=3.2*10^{-20}$ m$^2$/W; peak power P; fiber length L; operational wavelength $\lambda$; and the area A of the fundamental mode in the fiber. Self-phase modulation should be less than or equal to $\pi$ in order to prevent significant distortion of the frequency spectrum of the output pulse. Applicants have found that it can be desirable to limit the nonlinear phase shift in a fibre mode locked laser resonator to less than or equal to $\pi$, and in particular where the mode locked laser operates with the gain bandwidth of ytterbium, and more particularly where fiber comprised by (e.g., within) the resonator, such at the fiber of an TOF device, such as an up/down TOF device that includes a substantially untapered inner region, has normal (negative) dispersion at the operating wavelength of the mode locked laser.

Typically, in the embodiments of the inventions described herein, the optical fiber of a TOF device, whether just up taper, down taper or up/down taper, and/or the majority of the length of fiber comprised by a resonator or amplifier, will provide normal (negative D, in ps/nm-km) dispersion at the operating wavelength of the device. This can result in significant differences in terms of design and/or operation as compared to devices some or most of the length of fiber provides (positive D) dispersion.

All the above indicates that the use of large mode area fibers are beneficial for stable mode-locking. Also it is clear that independent control of intensities at SESAM surface and inside cavity fiber is also beneficial for stable operation. It is therefore preferable within this type of cavity as well as within other applications, to have a single mode optical fiber cable with low nonlinearity and a high stability against bend losses and coupling to any higher order modes supported within the waveguide. The cavity example of FIG. 10 is one such case.

In the example of FIG. 10, the up/down TOF device 1050 provides substantially less optical gain than the active optical fiber 1022, such as less than 40%, or less than 25%, or less than 10% of the optical gain provided within the resonator or cavity. Preferably the up/down TOF device 1050 is passive (substantially free of rare-earth dopants and hence substantially gain free) but as noted above an active device could also be used in some configurations. The entire resonator is preferably fabricated from polarization maintaining fibers but non-polarization-maintaining fibers can also be used. Furthermore, in certain configurations, additional optical components including, for example, polarizers, faraday rotators, waveplates, attenuators, modulators etc can also be included within the cavity.

In one example embodiment of the present invention, the length of fiber in the cavity length is 10 meters, resulting in a pulse repetition rate of approximately 10 MHz. The length of the low nonlinearity optical fiber device is approximately 8 meters, comprising 80% of the cavity. The device has a single mode fiber input and output, said fiber having core diameter of approximately 10 μm and core NA of 0.08. The device has central region forming the majority of the device length (7 m) and having core diameter of approximately 20 μm and waveguide NA of 0.08.

In another example embodiment, the cavity includes a total length of fiber of 100 meters, resulting in a pulse repetition rate of approximately 1 MHz. The length of the low nonlinearity optical fiber device is approximately 98 meters, comprising 98% of the cavity. The up/down TOF device 1050 has a single mode fiber input and output, said fiber having core diameter of approximately 10 μm and core NA of 0.08. The up/down TOF device has central region forming the majority of the device length (96 m) and having core diameter of approximately 50 μm and waveguide NA of 0.08.

In prior art laser cavities, comprising non tapered single mode optical fibers, nonlinearity within the waveguide restricts the length of the fiber cavity and hence limits the minimum pulse repetition rate that can be delivered by a passively modelocked laser cavity to 10's of MHz. Further reduction in repetition rate requires the use of pulse picker components after the cavity as well as additional gain to compensate for loss in the pulse picker components. These additional components add to the material cost, system complexity and system size. It is therefore an objective to produce a low pulse repetition rate modelocked oscillator having compact form factor and minimum complexity. This is enabled by the use of ultra-low nonlinearity single mode optical fiber devices according to specific embodiments of the present invention.

It will be appreciated that, within FIG. 10 and within example embodiments described above, the oscillator is configured with a SESAM as a saturable absorber. In all of these embodiments, it will be appreciated that a different type of saturable absorber can be utilized, for example based on carbon nanotubes, graphene, nonlinear polarization rotation etc.

Similarly it will be appreciated that, whilst the specific cavity architecture described in FIG. 10 and within previously described embodiments includes having the saturable absorber mirror butt-coupled directly to the cavity fiber, one can also configure the optical power of the cavity onto the saturable absorber using free space optics. For example, by collimating and then focusing the light onto the saturable absorber mirror, one can select the appropriate optics in order to generate the desired optical spot size and necessary intensity on the saturable absorber required to initiate and attain stable modelocking.

Figure 12:
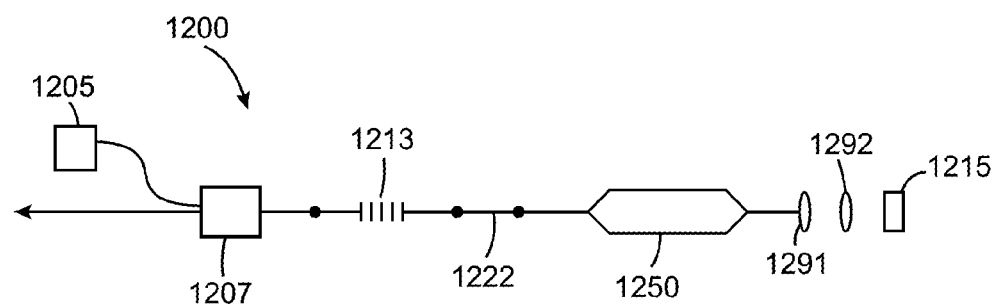
FIG. 12 schematically illustrates an embodiment wherein an optical resonator includes a TOF including an up/down taper where the output of the TOF is in optical communication with a saturable absorber.

FIG. 12 shows an example embodiment cavity 1200 wherein the output from the up/down TOF device 1250 is launched onto the SESAM 1215 by lenses, in this example comprising two lenses 1291 and 1292, which collimate and focus the light respectively. Reflected light from the SESAM 1215 is launched back into the up/down TOF device 1250 with low optical loss if the lenses are suitably selected and aligned.

Figure 13:
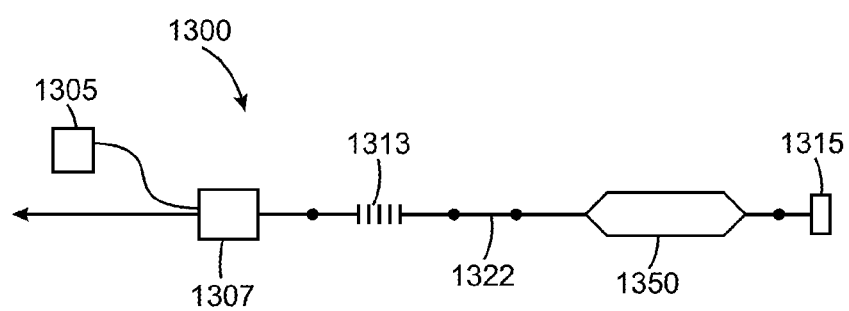
FIG. 13 schematically illustrates another example of an optical resonator including a TOF that includes an up/down taper.

In another example embodiment, shown by way of example in FIG. 13, an optical cavity 1300 comprises an up/down TOF device 1350 which is doped with an RED material such as Ytterbium, Erbium, Thulium, neodymium or a combination thereof. The up/down TOF device provides reduced optical nonlinearity within the cavity as described in previous embodiments, but also providing a substantial amount of the gain within the cavity. In this example, the TOF device can have the geometrical properties of passive or low gain TOF devices previously described in other embodiments of this current invention. The active up/down TOF device 1300 has an input section which is single mode at the laser operating wavelength, a central optical fiber section which has large mode area and could potentially support a plurality of optical modes, and an output optical fiber section which is single mode at the wavelength of operation of the cavity. Preferably the TOF device is one continuous piece of fiber but equally this can comprise more than one section of fiber spliced together to achieve the described physical and optical properties of the TOF device.

The active up/down TOF device 1350 is doped with a concentration of rare Earth ions suitable to absorb sufficient pump laser diode 1305 photons such that the device provides more gain at the optical cavity operational wavelength than the combined loss of the cavity, including the loss of the up/down TOF device. For example, if the TOF device is very long (for example greater than 50 m, such as, for example, about 100 m) in order to produce a very low pulse repetition rate, if the rare-Earth dopant level is too high, then all of the pump photons from the cavity pump laser diode 1305 will be absorbed in a relatively short length of the TOF device, resulting in a substantially long length of un-pumped rare-Earth doped optical fiber which will add significant unwanted loss to the cavity. Like end reference numerals in FIG. 13 to those of other FIGURES showing cavities indicate similar components, whose description is not always repeated. For example, reference 1313 in FIG. 13 indicates the same or similar component as reference 1013 in FIG. 10, i.e., a chirped fiber Bragg grating. The same consideration applies to the other FIGURES showing cavities.

Figure 14:
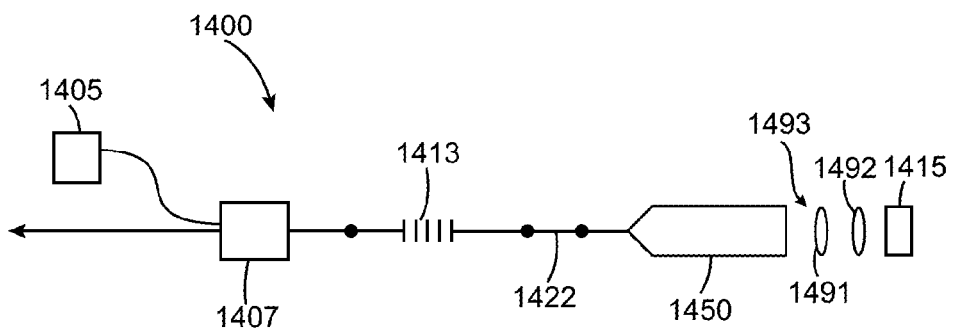
FIG. 14 schematically illustrates a further example of an optical device having an optical resonator that includes a TOF.

FIG. 14 shows another example embodiment of a modelocked optical fiber cavity according to the current invention. The cavity 1400 is similar to the cavity of FIG. 10 with the following exception. The up/down TOF device 1450 of this cavity, shown as a substantially passive fiber providing very little if any optical gain, has an input section which is a single mode fiber at the operational wavelength of the cavity and a length of large mode area optical fiber which has potential to guide a plurality of optical modes. As with all previously described embodiments of TOF devices, the region between the single mode and potentially multimode sections of the device is tapered in such a way that the single mode guidance in the single mode fiber section is maintained during the transition to the large mode area section of the device, resulting in propagation of substantially only the fundamental mode throughout the of the fiber device. The output 1493 of the up/down TOF device 1450 in this embodiment of the current invention is not tapered down or is tapered down to a diameter greater than that of the input single mode section of the device, such that the output optical fiber is large mode area and can potentially support a plurality of optical modes.

In this example, the output optical power from the TOF device is launched onto a SESAM 1415 via an arrangement of optical lenses 1491, 1492 with which the desired spot size for achieving and maintaining modelocking can be established through selection of the individual lenses. It will be appreciated that the SESAM could also be butt coupled to the output of the TOF device.

In FIG. 14, the output of the TOF device is shown as a cleaved fiber. This end face of this device preferably provides minimal back reflection of light back into the device and can be achieved with standard methods including angle-cleaving or suitable use of anti-reflection coatings or end capping of the device.

In all these mentioned embodiments of modelocked optical cavities, the architecture is shown in a similar way, having pump light from a pump diode enter the cavity through a Fiber Bragg grating which can be chirped or uniform. These cavities are also shown with the saturable absorber element positioned at the output of the TOF device.

It will be appreciated that, within the spirit of this invention, other configurations of modelocked fiber cavities can be built based on techniques known in the art, but the fundamental use of a tapered, large mode area optical fiber device which supports substantially only the fundamental mode to reduce optical nonlinearity and provide means to increasing cavity length, reducing pulse repetition rate is achieved.

Figure 15:
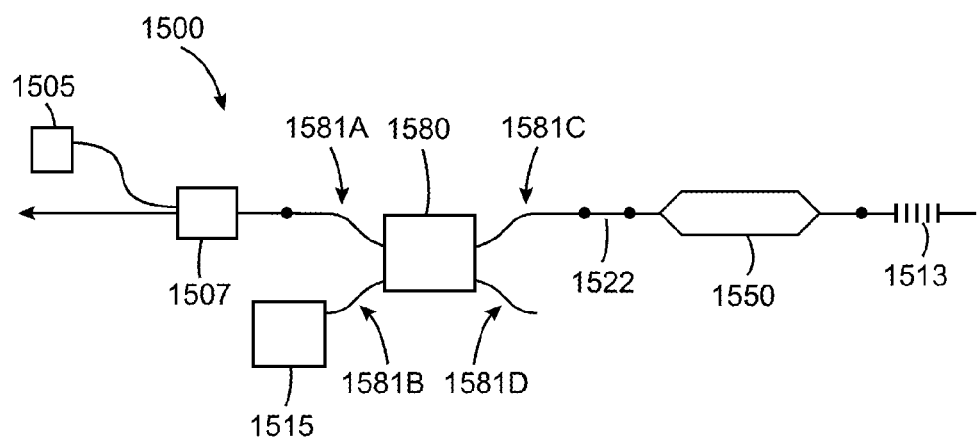
FIG. 15 schematically illustrates an additional example of an optical device having an optical resonator that includes a TOF including an up/down taper.

By way of example, FIG. 15 shows one such example architecture of a modelocked optical fiber laser cavity 1500 comprising a pump laser diode 1505 which delivers pump light at a pump wavelength into a wavelength division multiplexer 1507 designed for the pump wavelength and cavity operating wavelength. The pump light is then injected into the optical cavity and into a length of RED fiber (Ytterbium in this example) 1522 which provides optical gain. The amplified optical power (emission from the Ytterbium-doped fiber) propagates into the single-mode input of a substantially passive up/down TOF device 1550) as described in previous embodiments of the present invention. The output of the TOF device, in this case also a single mode optical fiber, is spliced to a chirped optical fiber Bragg grating 1513 which reflects light at a pre-defined optical wavelength determined by the design of the grating.

Reflected light from the grating propagates back through the various fibers and into a fiber coupler device 1580 with coupling ratio as per the optimized design of a cavity. By way of example, the chosen coupler ratio in FIG. 15 is 20:80 in which 80% of the optical power propagating into the coupler device input at port 1581C is directed to port 1581B and 20% to port 1581A. The 80% output port 1581B is connected to a saturable absorber 1515 in this example a SESAM. 20% of the power exits the cavity through coupler port 1581A. Pulsed light reflected from the SESAM propagates back through the coupler device into the cavity with some of the power lost through coupler port 1581D, which can be used for monitoring purposes.

In various practices of the disclosure any optical apparatus described herein may be configured to provide pulses having a time duration of no greater than 500 ns; no greater than 100 ns; picoseconds time duration, defined herein as 1 ns or less; no greater than 200 ps; no greater than 100 ps. In combination with any of the foregoing, the pulses can be no shorter than, for example, 1 ps or 500 fs. In other practices, the pulse can be no less than 500 fs and no greater than 100 or 200 ps. It will be appreciated that the examples provided in this application relate to fiber lasers, such as pulsed fiber lasers, yet this is not a limiting case and the same inventive process applies, as one example, to lasers such as Q-switched lasers, gain switched lasers, and other types of laser systems, including those based on a MOPA architecture.

What is claimed is:

1. A laser system for generating optical pulses at an operating wavelength of the laser system, the system having an optical resonator comprising:
   first and second reflectors; and
   a tapered optical fiber disposed between the first and second reflectors and having a core which has a tapered input section which tapers from single mode to multimode at the laser operating wavelength, an inner section of substantially constant diameter capable of supporting multiple modes at the laser operating wavelength and a tapered output section which tapers from a first diameter to a second diameter that is smaller than the first diameter.

2. The laser system according to claim 1, wherein the tapered output section of the core tapers from a diameter capable of supporting multiple modes to single mode at the laser operating wavelength.

3. The laser system according to claim 1, wherein the taper of the tapered input section is such that the single mode guidance is maintained during the transition to the inner section so that substantially only the fundamental mode propagates through the inner section.

4. The laser system according to claim 1, wherein the gain medium of the laser system is comprised of the tapered optical fiber.

5. The laser system according to claim 1, wherein the gain medium comprises a length of rare earth doped (RED) optical fiber separate from the tapered optical fiber.

6. The laser system according to claim 1, wherein the tapered optical fiber comprises at least 80% of the length of the optical resonator.

7. The laser system according to claim 1, wherein the repetition rate of the generated optical pulses is no more than 10 MHz.

8. The laser system according to claim 1, wherein the second reflector is a semiconductor saturable absorber mirror and one or more free space optical elements are disposed between the tapered output section and the semiconductor saturable absorber mirror.

9. The laser system according to claim 1, wherein the tapered optical fiber is composed of a single continuous piece of fiber.

10. The laser system according to claim 1, wherein the length of the tapered optical fiber is greater than about 5 meters.

11. The laser system according to claim 1, wherein the length of the tapered optical fiber is greater than about 10 meters.

12. The laser system according to claim 1, wherein the tapered input section and/or the tapered output section include a nonlinear taper profile or alternatively wherein the tapered input section and/or the tapered output section include a substantially exponential taper profile.

13. The laser system according to claim 1, wherein the length of the tapered input section and the tapered output section combined is no more than 10% of the total length of the tapered optical fiber.

14. The laser system according to claim 1, wherein the inner section of the core of the tapered optical fiber has a refractive index (RI) profile which is substantially constant.

15. The laser system according to claim 1, wherein the inner section of the core of the tapered optical fiber has a refractive index (RI) profile taken relative to silica wherein the percentage RI variation of the core RI according to the formula [(maximum RI−minimum RI)/(2×minimum RI)]× 100 is no greater than about 20%.

* * * * *